United States Patent
Rai et al.

(10) Patent No.: US 7,702,054 B2
(45) Date of Patent: Apr. 20, 2010

(54) DETECTING ERRORS IN TRANSMITTED DATA

(75) Inventors: Barinder Singh Rai, Surrey (CA); Manfred Wittmeir, Aichach (DE)

(73) Assignee: Seiko Epson Corporation, Tokyo (JP)

(*) Notice: Subject to any disclaimer, the term of this patent is extended or adjusted under 35 U.S.C. 154(b) by 932 days.

(21) Appl. No.: 11/381,845

(22) Filed: May 5, 2006

(65) Prior Publication Data

US 2007/0294595 A1 Dec. 20, 2007

(51) Int. Cl.
*H04L 7/00* (2006.01)

(52) U.S. Cl. .......... 375/355; 375/219; 375/220
(58) Field of Classification Search .......... 375/224, 375/341, 225, 259, 219, 222, 220
See application file for complete search history.

(56) References Cited

U.S. PATENT DOCUMENTS

| | | | | |
|---|---|---|---|---|
| 4,472,803 A | * | 9/1984 | Iijima | 370/522 |
| 4,577,310 A | * | 3/1986 | Korsky et al. | 370/359 |
| 5,331,647 A | * | 7/1994 | Seki et al. | 714/807 |
| 5,377,188 A | * | 12/1994 | Seki | 370/390 |
| 6,192,492 B1 | * | 2/2001 | Masiewicz et al. | 714/56 |
| 6,279,140 B1 | | 8/2001 | Slane | |
| 6,366,625 B1 | * | 4/2002 | Minami et al. | 375/341 |
| 6,697,604 B1 | | 2/2004 | Rimpela et al. | |
| 6,760,877 B1 | | 7/2004 | Lappetelainen et al. | |
| 2002/0075966 A1 | * | 6/2002 | Mikkola et al. | 375/262 |
| 2004/0203371 A1 | | 10/2004 | Loh et al. | |
| 2005/0220073 A1 | * | 10/2005 | Hsu | 370/351 |
| 2006/0165190 A1 | * | 7/2006 | Tamaki et al. | 375/262 |

* cited by examiner

*Primary Examiner*—Emmanuel Bayard

(57) ABSTRACT

This invention relates to methods and apparatus for detecting errors in transmitted data. In one embodiment, a method includes the steps of transmitting data, accumulating a transmit sum, receiving the data, accumulating a receive sum, comparing the transmit and receive sums; and evaluating the result of the comparison for determining a transmission accuracy metric.

25 Claims, 2 Drawing Sheets

DETECTING ERRORS IN TRANSMITTED DATA

BACKGROUND

1. Field

This invention relates to methods and apparatus for detecting errors in transmitted data.

2. Description of the Related Art

One critical function performed by a computer system is transmitting data between devices, components, or modules that may reside in the same or different computer systems. It is generally desirable to provide a means for determining whether data has been accurately transmitted. In some systems, a parity bit, an error checking code, or the like is transmitted along with each unit of data for use by the receiving device in determining whether the data was accurately transmitted. Other systems employ a test procedure before beginning data transmissions for verifying that the sender, receiver, and communications channel are functioning properly. In these systems, a test pattern or other test data may be sent to a receiver, which the receiver may then send back to the sender. While the known methods are useful, it is generally recognized that they increase overhead and can increase latency.

In addition, in systems that rely on a battery for power, there is an ever-present need to minimize power consumption in order to maximize battery life. Transmitting an error checking code along with each block of data consumes the scarce amount of power available in battery-powered systems. In addition, many known techniques verify the accuracy of transmitted data beyond what is required or suitable for the particular purpose for which some portable systems were designed.

Accordingly, there is a need for detecting errors in transmitted data that minimizes processing overhead, latency, and power consumption, and which provides a degree of accuracy that is suitable for the particular purpose of the device.

SUMMARY

The invention is directed, in one embodiment, to a method for detecting errors in transmitted data. The method includes the steps of transmitting data, accumulating a transmit sum, receiving the data, accumulating a receive sum, comparing the transmit and receive sums, and evaluating the result of the comparison for determining a transmission accuracy metric.

In another embodiment, the invention is directed to a device adapted for detecting errors in transmitted data. The device includes first and second components. The first component includes a transmitting unit for transmitting data and a first memory for storing a transmit sum. The transmit sum is a sum of the data transmitted. The first component is adapted for accumulating the transmit sum. The second component includes a receiving unit for receiving the data and a second memory for storing a receive sum. The receive sum is a sum of data received by the receiving unit. The second component is adapted for accumulating the receive sum.

In addition, one embodiment of the invention is directed to a machine readable medium embodying a program of instructions for execution by a machine to perform a method for detecting errors in transmitted data. The program of instructions provide for transmitting data, accumulating a transmit sum, receiving the data, accumulating a receive sum, comparing the transmit and receive sums, and evaluating the result of the comparison for determining a transmission accuracy metric.

In yet another embodiment, the invention is directed to a system adapted for detecting errors in transmitted data. The system includes first and second devices. The first device includes a transmitting unit for transmitting data and a first memory for storing a transmit sum. The transmit sum is a sum of the data transmitted. The first device is adapted for accumulating the transmit sum. The second device includes a receiving unit for receiving the data and a second memory for storing a receive sum. The receive sum is a sum of data received by the receiving unit. The second device is adapted for accumulating the receive sum.

Other aspects and advantages of the invention will become apparent from the following detailed description, taken in conjunction with the accompanying drawings, illustrating by way of example the principles of the invention.

DETAILED DESCRIPTION OF PREFERRED EMBODIMENTS

Figure 1:
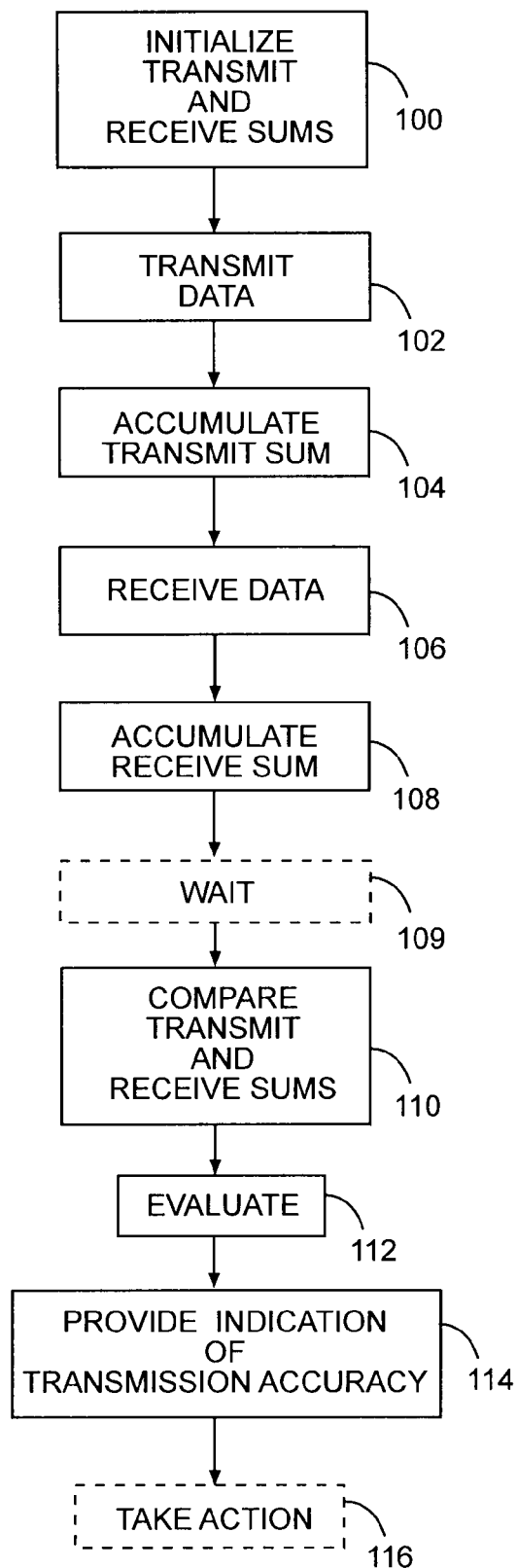
FIG. 1 is a flow diagram of a preferred method for detecting errors in transmitted data according to the invention.

The present invention is directed to methods, apparatus, systems, and articles of manufacture for detecting errors in transmitted data. The present invention minimizes power consumption and provides a degree of accuracy that is suitable for the particular purpose of the device. It will be appreciated, however, that the present invention may be practiced without some or all of the specific details described below. In addition, one skilled in the art will understand well known processes and operations that have not been described in detail in order not to unnecessarily obscure the present invention. Reference will now be made in detail to preferred embodiments of the invention, examples of which are illustrated in the accompanying drawings. Wherever possible, the same reference numbers are used in the drawings and the description to refer to the same or like parts.

The term "data" is used herein to refer to a representation of information in a coded manner suitable for communication, interpretation, or processing. Data includes addresses, instructions to perform an operation, status indications, and any other type of information, such as the information that is manipulated or processed by a computer system. It is preferred that the data be expressed numerically. Further, in a preferred embodiment, data is expressed in the binary number system. In other embodiments, data is expressed in octal, hexadecimal, decimal, or other number systems.

The term "error" is used herein to refer to a value that is not consistent with the true, specified, or expected value. An error occurs when there is a discrepancy between transmitted and received data. An error may occur for any number of reasons, including because the data was not transmitted with sufficient power, the data was transmitted at too fast of a rate for the receiver, the data was transmitted at a time when the receiver was not ready to receive the data, the transmission was interfered with (such as, e.g., by cross-talk), a fault exists in the transmitter, the receiver, or the communications medium.

As used herein, the term "transmit" refers to the sending of data over a communications channel. The data may be represented as an electrical, optical, or acoustic signal. The communications channel may be an electrical conductor, such as a wire or conductive trace on a circuit board or integrated circuit (IC), an optical conductor, such as fiber-optic cable, the atmosphere, or any other suitable medium. In other words, transmitting includes both wired and wireless communications. Further, the communications channel may be synchronous or asynchronous, serial or parallel, duplex, half-duplex, or simplex. The term also includes sending blocks of data in a "burst" transmission. As used herein, the term "receive" refers to accepting a signal from a communications channel. This term also includes converting an incoming electrical, optical, or acoustic signals into data.

FIG. 1 is a flow diagram illustrating a preferred method for detecting errors in transmitted data according to the present invention. The method includes steps of: initializing transmit and receive sums (100); transmitting data (102); accumulating a transmit sum (104); receiving the data (106); accumulating a receive sum (108); comparing the transmit and receive sums (110); evaluating the result of the comparison for detecting errors in transmitted data (112); and providing an indication of transmission accuracy (114). In addition, the method includes optional steps of waiting (109), and taking action (116) as a result of the indication of transmission accuracy.

In step 100, the transmit and receive sums are preferably initialized to zero, but any suitable value may be selected, provided both sums are initialized to the same value. In steps 104 and 108, the transmit and receive sums are accumulated. These sums are preferably accumulated in the same manner. The transmit sum is the sum of the data transmitted, and the receive sum is a sum of the data actually received. In step 110, the comparison of the transmit and receive sums is preferably performed by subtracting one sum from the other, though other methods may be employed.

It is important, however, that the comparison of step 110 be performed at a point in time when the accumulation of the respective sums are in sync. For example, the respective sums would not be in sync when the value of a particular element of transmitted data has been added to the transmit sum, but sufficient time had not passed for this element of data to have been transmitted and added to the receive sum. It has been recognized that there may be a time delay between when a particular element of data is added to the transmit sum and when it is added to the receive sum. For this reason, the method may include the optional step 109, which provides a time delay period for data to be transmitted and added to the receive sum. During the wait time, the transmitter ordinarily refrains from transmitting any further data. Generally speaking, this does not present a problem because the lag time is typically short. In addition, the time delay is preferably known ahead of time so that the transmitter can be scheduled to perform another task during any necessary wait time.

In step 112, the result of the comparison of the transmit and receive sums is evaluated. In step 114, an indication of transmission accuracy is provided to any desired system, device, component, or module. The indication of transmission accuracy may be binary, that is, "accurate" or "not accurate." In one embodiment, if the sums are not exactly the same, the transmitted data is deemed to include errors. In another embodiment, if the sums differ by more than a predetermined threshold, the transmitted data is deemed to include errors. In this later embodiment, if the sums differ by less than the predetermined threshold, the transmitted data will be deemed not to include errors, even if there are one or more errors in the transmitted data. Inasmuch as the invention may be implemented with both of the foregoing embodiments, it will be appreciated that the invention is capable of evaluating the transmission of different types of data under different criteria. For example, transmitted data comprised of addresses or instructions could be deemed to include errors if the transmit and receive sums are not exactly the same. On the other hand, transmitted data comprised of audio or video information could be deemed to include errors if the transmit and receive sums differ by less than the predetermined threshold. One of ordinary skill in the art will appreciate that an error in an address or instruction is almost always problematic, while small errors in audio or video information may not be readily discernable by the listener or viewer. An address or instruction error must be corrected by retransmitting the data, but there may be little point in retransmitting audio or video information, especially where that information is time dependent (e.g., streaming audio or video). By providing the capability of evaluating different types of transmitted data under different criteria, a system or device can be designed to only require retransmission of data where it is critical or helpful, thereby minimizing power consumption.

In step 114 an indication of transmission accuracy is provided. The step 114 recognizes that the indication is preferably acted upon by the system, device, component, or module to which it is provided. The step 116 is for taking action in response to the provided indication of transmission accuracy.

Two exemplary actions relate to signal power level and data rate. In one embodiment, if the data is deemed to include errors, the signal power at which data is subsequently transmitted is increased. The data including the errors may be re-transmitted at the higher power level. If the data is deemed not to include errors, the signal power level at which data is subsequently transmitted may be reduced. In another embodiment, if the data is deemed to include errors, the rate at which data is subsequently transmitted is reduced. The data including the errors may be re-transmitted at the lower transmission rate. If the data is deemed not to include errors, the rate at which data is subsequently transmitted may be increased. One of ordinary skill in the art will recognize other actions that may be taken based on the indication of transmission accuracy.

As an example of the method of FIG. 1, consider writing a pixel to an address 1 on an 8-bit bus. The pixel is a color pixels defined by three 8-bit component values, i.e., the pixel is defined by 24 bits. In this example, the components for defining the pixel to be written are: 51, 102, and 255, which may be expressed in binary form as the three bytes: (a) 0011 0011; (b) 0110 0110; and (c) 1111 1111. In addition, the address 1 may also be expressed in binary as a single byte: 0000 0001. According to the method, the transmit and receive sums are first initialized. Assume that they are each initialized to zero. The address in then transmitted. As the address is transmitted, the transmit sum is incremented by the value of the address. The pixel data is transmitted next, a byte at a time. When the first byte is transmitted the value 51 is added to the transmit sum. When the second byte is transmitted the value 102 is added to the transmit sum. Finally, when the third byte is transmitted the value 255 is added to the transmit sum. At this point, the transmit sum stands at 409 (1+51+102+255=409). The method also calls for calculating a receive sum. If the address is received as 1, and the first, second, and third bytes are received as 51, 102, and 255, respectively, the receive sum will also total 409. Comparing the transmit and receive sums by subtraction yields zero providing an indication that the address and all of the data were received without errors.

A variation on this example illustrates how the present invention may be used in an alternative embodiment. Assume again that the single pixel is to be written to address 1. This time, however, separate transmit and receives sums are maintained for address data and pixel data. Assume that the transmit and receive sums for the address both total 1, indicating that the address was received without error, but that the transmit and receive sums for the pixel data total, respectively, 408 and 407. The difference in the pixel data indicates that the pixel data was not received without error. It may be determined that it is not necessary to retransmit the pixel data even though it was received with error if it is judged that the discrepancy in the pixel data would not be perceptible a viewer, i.e., the indication is less than or equal to a predetermined threshold of say four.

The present invention may be practiced in a wide variety of apparatus and systems. Preferred embodiments include a transmitter, receiver, and communications channel. In some embodiments, the transmitter and receiver reside in different systems or devices. For example, the transmitter may be a first mobile telephone, the receiver a second mobile telephone, and the communications channel is a mobile telephone network. As another example, the transmitter may be a first computer system, the receiver a second computer system, and the communications channel is a computer network. In other embodiments, the transmitter and receiver reside in the same system or device. One such example is a personal computer system where the transmitter is a CPU, the receiver is a peripheral device, and the communications channel is a bus. In yet other embodiments, the transmitter and the receiver may reside in the same integrated circuit. For example, the transmitter may be a microprocessor core, the receiver is an LCD controller core, and the communications channel is a bus, where the cores and the bus all reside on a "system-on-a-chip." In yet another example, the transmitter is a CPU or digital signal processor IC, the receiver is a graphics display controller IC, and the communications channel is a bus, where the integrated circuits are components of a device, such as a mobile telephone. It should be noted that in these examples, the designation of one thing as a transmitter and another as a receiver is somewhat arbitrary and in many cases the designation could easily be reversed. For instance, consider the first example of the mobile telephones. It will be appreciated that during the course of a communication session each of the first and second mobile telephones assume the roles of transmitter and receiver many times.

Figure 2:
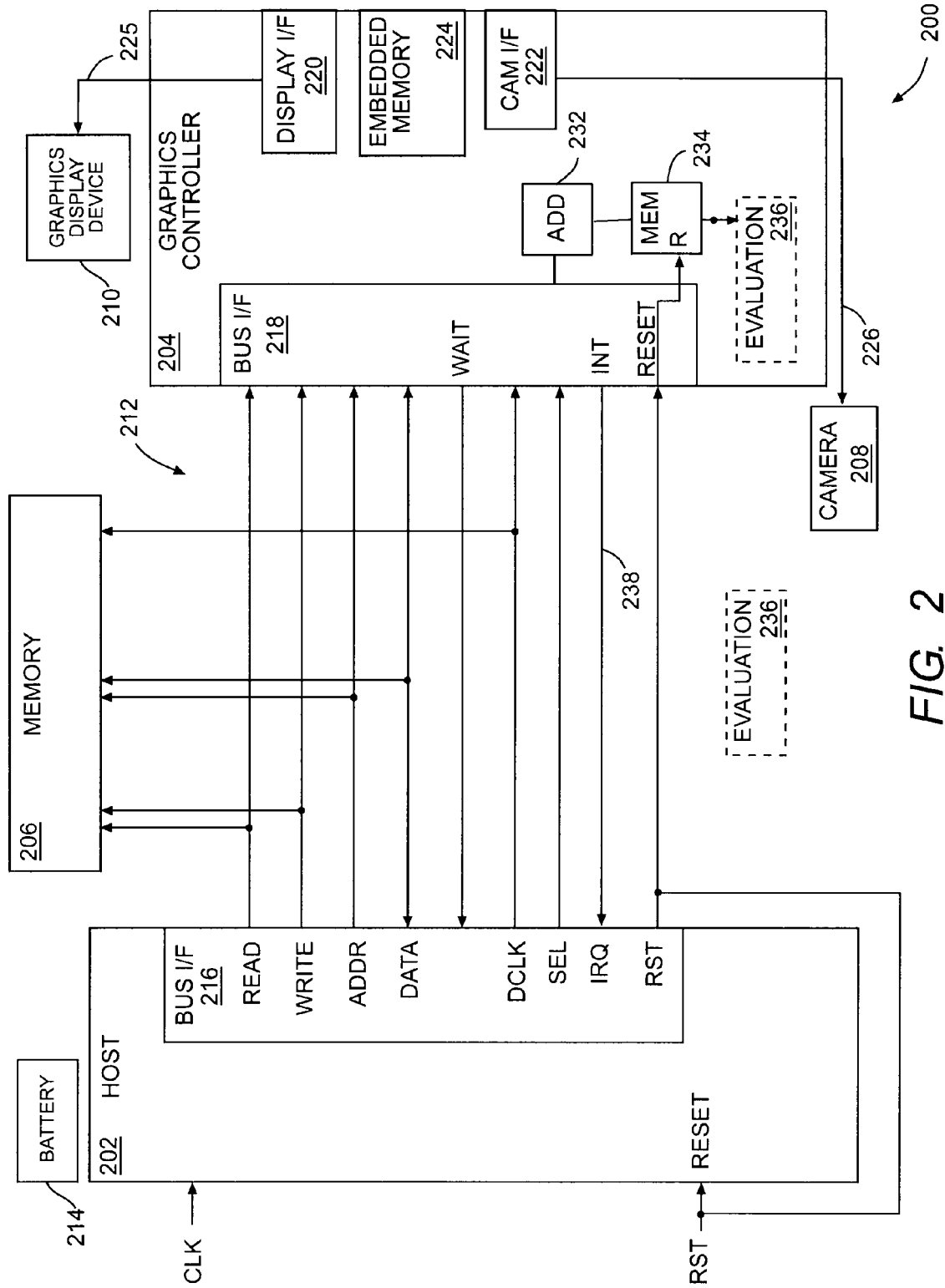
FIG. 2 is a simplified block diagram of a device illustrating an exemplary context for the present invention.

Referring to FIG. 2, a simplified block diagram of a preferred device 200 that provides an exemplary context for the present invention is shown. Preferably, the device 200 is a communication or computer system adapted for communicating with other such systems. In one embodiment, the device 200 is a mobile telephone. In other embodiments, the device 200 is a portable digital assistant for providing administrative and other functions, or a portable entertainment device for rendering audio and video, and playing computer games.

The device 200 includes a host 202, a graphics display controller 204, a memory 206, an image capture module 208, a graphics display device 210, a bus 212, a power source 214, as well as other components (not shown). The bus 212 serves to couple the host 202, the display controller 204, and the memory 206. The host 202 is a processor, such as a CPU or DSP, and includes a bus interface 216 for interfacing with the bus 212. The display controller 204 is preferably adapted for receiving, transforming, and combining image data, and driving a display device with suitable image data in accord with the timing requirements of the display. The display controller 204 includes a bus interface 218 for interfacing with the bus 212, a display interface 220 for interfacing with a display device, a camera interface 222 for interfacing with an image capture module or device, and an embedded memory 224. The display controller 204 may receive image data from the host 202, the image capture module 208, or from another source. The display controller 204 employs the embedded memory 224 for storing one or more frames of image data used for refreshing a display device, as well as for other purposes. It should be appreciated that the embedded memory 224 may be employed for storing data received from the host 202 or the image capture module 208. The display controller 204 is coupled with the graphics display device 210 via a display bus 225. Preferably, the graphics display device 210 is an LCD, but it may be manufactured using any other suitable display technology, e.g., OLED, plasma, CRT. Further, more than one graphics display device may be provided. The display controller 204 is coupled with the image capture module 208 via a camera bus 226. Preferably, the image capture module 208 is a digital camera for capturing still or video images having a CCD or CMOS sensor. The power source 214 is preferably a battery, though this is not essential.

According to a preferred embodiment, the host 202 is capable of initializing a transmit sum, transmitting data, and accumulating the transmit sum. Preferably, the initializing and accumulating of the transmit sum is performed by software that may be stored in the memory 206 and executed by the host. In this embodiment, the transmit sum may be stored in the memory 206 or in a register, cache, or other memory in the host. Alternatively, hardware may be provided in the host 202 for the initializing and accumulating of a transmit sum. For example, in one embodiment, the hosts includes an accumulator for accumulating the transmit sum and a register for storing the transmit sum. The host is preferably adapted for receiving a particular signal (such as on the shown reset input) and responding to the signal by storing an initial value in the memory. Preferably, the particular signal is a reset signal (RST).

In addition, according to a preferred embodiment, the graphics display controller 204 is capable of receiving data, and initializing and accumulating a receive sum. The display controller 204 includes an accumulator 232 (labeled "ADD") for accumulating the receive sum. The display controller 204 also includes a memory 234 (labeled "MEM") for storing the receive sum. The memory 234 is adapted for receiving (preferably on a reset input) and responding to a particular signal by storing an initial value in the memory 234. Preferably, the memory 234 is adapted to store the same initial value that is stored on the host side. Further, the memory 230 preferably adapted so that it stores the initial value in response to the particular signal. Preferably, the memory 230 stores the initial value in response the reset signal (RST).

The host 202 and the graphics display controller 204 are preferably separate ICs, each including a reset input. In one embodiment, when the device 200 is powered-up after being turned off, the reset signal is automatically asserted and presented to the respective reset inputs. The host 200 is adapted, when it receives the reset signal, to cause the initial value to be initialized. Similarly, when the display controller 204 receives the reset signal, it provides the signal to the memory 234 causing the memory to be initialized. In addition, the host 200 preferably includes a reset output coupled with the reset input of the display controller 204. In an alternative embodiment, the host may use the reset output to provide a reset signal to the display controller. An advantage of this feature is that it permits the host to initialize the memory 234 at any desired time by generating an internal reset (or other) signal and providing the internally generated signal to the reset input of the display controller 204. This feature is useful for those times when it is desired to initialize the memory 234 without having to initialize the entire device 200.

With respect to the host, the ability to accumulate transmit sum, may be provided in software or hardware. In one embodiment, the accumulation feature is provided in software and the hardware is adapted so that whenever data is placed on the bus 212 by the host 202 for transmission to the display controller 204, the hardware provides an indication to the software. Preferably, the hardware provides an indication that includes the value of the data placed on the bus in each address and data cycle. In an alternative embodiment, the accumulation feature is provided in software and the software is provided with the values of data transmitted on the bus from a transmission process, module, or driver within software. In yet another embodiment, the ability to accumulate a transmit sum in the host is provided in host-side special-purpose hardware. In this embodiment, preferably, the accumulation capability is provided by a device, e.g. an adder, coupled with the bus interface 216 in such a way that whenever data is placed on the bus 212 by the host 202 for transmission to the display controller 204, it is also simultaneously placed on the inputs of the accumulation device.

In embodiments where the ability to accumulate a transmit sum in host is provided in host-side hardware, logic is preferably provided in the host 202 for distinguishing between when data is being sent to the display controller 204 from times when data is being transmitted elsewhere, e.g., the memory 206 (as well as from times when data is being fetched). For example, such logic for distinguishing transfer-type may be coupled with a chip select signal ("SEL") and a write signal ("WRITE"). When these signals are asserted, the logic recognizes that the data is being transmitted to the display controller 204. Alternatively, the logic for distinguishing transfer-type may be coupled with an address signal ("ADDR") and the write signal. If the write signal is asserted and the address is decoded to indicate an address associated with the display controller 204, the logic recognizes that the data is being transmitted to the display controller 204. One of ordinary skill in the art will recognize other techniques that may be employed for distinguishing transfer-type.

With respect to the graphics display controller, the accumulator 232 may be any apparatus or circuit known in the art. The accumulator 232 is coupled with the bus interface 218 in such a way that whenever data is received on the bus 212 by the display controller 204 from the host 202 it is also simultaneously placed on the inputs of the accumulator 232.

In addition, logic (not shown) is preferably provided in the display controller 204 for distinguishing between when data is being received from the host 202 from times when data is being received from other sources. Such logic in the display controller 204 for distinguishing the transfer-type of received data may be provided in a number of ways, many of which are analogous to those described above with respect to transfer-type logic distinguishing in the host 202, e.g., assertion of the chip select signal (SEL).

According to a preferred embodiment, the device 200 includes an evaluation unit or process 236 that is adapted for comparing the transmit and receive sums, and for evaluating the results of the comparison. Preferably, an evaluation process 236 is provided in software that runs on the host 202. In other embodiments, the evaluation process 236 is provided in software that runs on the graphics controller on another device capable of executing software in instructions. Alternatively, as shown in FIG. 2, an evaluation unit 236 is optionally (as shown with dashed lines) located either in the display controller 204, or in a module separate from the host 202 and display controller 204. In addition, the evaluation unit 236 may be provided within the host 202 (not shown).

In one embodiment, the evaluation unit or process 236 is adapted to read the content of the memory 234. When the evaluation unit or process 236 resides in the same device, module, or component as the memory, the evaluation unit or process 236 and the memory may be directly coupled. When the evaluation unit or process 236 resides in a different device, module, process, or component from the one the memory resides in, the evaluation unit or process 236 may be adapted to read the contents of the memory in one or more ways. As one example, consider an evaluation software process 236 running on the host 202. This evaluation process 236 may read the contents of the memory 234 via the bus 212 using the standard method that other host software processes use for reading data stored in the memory or registers of the display controller 204.

The evaluation unit or process 236 is also adapted to subtract the value (receive sum) stored in the memory 234 from the value (transmit sum) stored in another memory. In addition, the evaluation unit may compare the result of the subtraction with a predetermined threshold value. In one embodiment, the threshold value is zero. In another embodiment, the threshold value is greater than zero, thus allowing for a particular degree of error. For example, the threshold value may be 1, 2, 3, 5, 10, 50, or 100. The evaluation unit or process 236 is further adapted to provide an indication of transmission accuracy to the host 202, the display controller 204, or some other device, component, or module (or to multiple recipients).

In one embodiment, the evaluation unit or process 236 performs its evaluation and provides an indication of transmission accuracy in response to a command, such as one from the host 202. Alternatively, the evaluation unit or process 236 may perform its evaluation function continuously, or periodically at specified intervals, providing an indication of transmission accuracy to one or more devices, components, or modules whenever errors in data transmission are deemed to be detected.

Bearing in mind that the device 200 shown in FIG. 2 is exemplary, it will be appreciated that the invention may be practiced in any system having a first component and a second component, where, preferably, the first component includes a transmitting unit and a memory for storing a transmit sum, and is adapted for accumulating the transmit sum, and the second component, includes a receiving unit for receiving the data and a second memory for storing a receive sum, and is adapted for accumulating the receive sum.

In a preferred embodiment, an indication of transmission accuracy is provided by the second component, e.g., the graphics controller, by generating an interrupt (INT) that is provided to an interrupt request (IRQ) input of the first component, e.g., the graphics controller. For example, whenever errors are detected in transmitted data, an interrupt is generated.

In alternative embodiments, the invention may be practiced in a system having a plurality of first and second components, and first and second transmission channels, such as a system having two or more sub-systems for performing the same or similar functions provided for the purpose of providing redundancy. Such a system may be desirably provided for operation in an electrically noisy environment. As one example, a system includes three sub-systems that perform the same operations and provide the same output. Each subsystem is adapted to provide an indication of transmission accuracy, e.g., a first indication, a second indication, and a third indication. If the first, second, and third indications are identical, it may be presumed that the sub-systems have not been effected by environmental noise. However, where one of the indications differs from the other two, the first indication equals the second, but not the third, it may be inferred that a transmission within the third subsystem has been compromised by environmental noise. In this example, the system is preferably adapted to use or otherwise rely on the output of the first and second systems, while discarding or ignoring the output of the third system.

While the exemplary device shown in FIG. 2 has been shown and described herein in the context of detecting errors in data transmitted from the host 202 to the display controller 204, it should be appreciated that the present invention may be employed for detecting errors in data transmitted from the display controller 204 to the host 202. Moreover, it should be appreciated that the present invention may be employed for detecting errors in data transmitted from the image capture module 208 to the display controller 204. One of ordinary skill in the art will appreciate that present invention may be employed in many other contexts as well.

As mentioned above, the designation of a device as a transmitter or receiver is often somewhat arbitrary as particular device frequently performs both functions in a communication session. In one embodiment, the evaluation unit or process 236 is adapted to perform the evaluation function for plural sets of transmitters and receivers. For instance, a single evaluation unit could be used to evaluate transmission errors in data transferred from the host 202 to the display controller 204, from the display controller 204 to the host 202, and from image capture module 208 to the display controller 204.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

In an alternative embodiment, the present invention can be embodied as machine readable code on a machine readable medium. The machine readable medium is any data storage device that can store data which can be thereafter read by a computer system. Examples of the machine readable medium include hard drives, network attached storage, read-only memory, random-access memory, CD-ROMs, CD-Rs, CD-RWs, magnetic tapes, and other optical and non-optical data storage devices. The machine readable medium can also be distributed over a network coupled computer system so that the computer readable code is stored and executed in a distributed fashion. The machine readable code embodies a program of instructions for execution by the machine to perform a method for determining the accuracy of digital data transmissions. The instructions, in a preferred embodiment, provide for transmitting data, accumulating a transmit sum, receiving the data, accumulating a receive sum, comparing the transmit and receive sums, and evaluating the result of the comparison for determining a transmission accuracy metric. In addition, the instructions may provide for any of the features of the present invention described herein with respect to the other described embodiments.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. Further, the terms and expressions that have been employed in the foregoing specification are used as terms of description and not of limitation, and are not intended to exclude equivalents of the features shown and described or portions of them. The scope of the invention is defined and limited only by the claims that follow.

We claim:

1. A method for detecting errors in transmitted data, comprising:
   transmitting data on a first communications path by a transmitting unit;
   accumulating a first transmit sum in a first memory, the first transmit sum being a sum of first data transmitted on the first communications path, the first data to be processed in at least one operation that is disassociated from the transmitting of the first data on the first communications path;
   receiving data by a receiving unit;
   accumulating a first receive sum in a second memory, the receive sum being a sum of data received from the first communications path; and
   comparing the first transmit and first receive sums in a first comparison, and evaluating the result of the first comparison by an evaluation unit, the first comparing and evaluating to determine a first transmission accuracy metric.

2. The method of claim 1, wherein the first data includes pixel data.

3. The method of claim 1, further comprising, if the first transmission accuracy metric is less than a particular threshold, adjusting one of:
   (a) the power at which data is transmitted;
   (b) the rate at which data is transmitted; and
   (c) both the rate and the power at which data is transmitted.

4. The method of claim 1, further comprising re-transmitting data if the first transmission accuracy metric is less than a particular threshold.

5. The method of claim 1, further comprising:
   accumulating a second transmit sum in the first memory, the second transmit sum being a sum of second data transmitted on a second communications path, the second data defining address information;
   accumulating a second receive sum in the second memory, the second receive sum being a sum of data received from the second communications path; and
   comparing the second transmit and second receive sums in a second comparison, and evaluating the result of the second comparison by the evaluation unit, the second comparing and evaluating to determine a second transmission accuracy metric.

6. The method of claim 5, further comprising re-transmitting the first data if the first transmission accuracy metric is less than a first threshold, and re-transmitting the second data if the second transmission accuracy metric is less than a second threshold, the first and second thresholds being different.

7. The method of claim 1, wherein the comparing of the first transmit and first receive sums, the evaluating of the result of the first comparison by the evaluation unit, and the determining of a first transmission accuracy metric are performed in response to a command from a host.

8. The method of claim 1, wherein the first data includes at least one instruction that is executed in the at least one operation that is disassociated from the transmitting of the first data on the first communications path.

9. The method of claim 1, wherein the first data includes audio data.

10. The method of claim 5, further comprising:
if the first transmission accuracy metric is less than a first threshold, adjusting one of:
(a) the power at which data is transmitted,
(b) the rate at which data is transmitted, or
(c) both the rate and the power at which data is transmitted; and
if the second transmission accuracy metric is less than a second threshold, re-transmitting the second data, the first and second thresholds being different.

11. A system for detecting errors in transmitted data, comprising:
a communications channel having a first communications path;
a first component, including:
a transmitting unit to transmit data,
a first memory to store a first transmit sum, the first transmit sum being a sum of first data transmitted on the first communications path by the transmitting unit, and
a first accumulator to accumulate the first transmit sum;
a second component, including:
a receiving unit to receive data,
a second memory to store a first receive sum, the first receive sum being a sum of data received from the first communications path by the receiving unit, and
a second accumulator to accumulate the first receive sum, wherein the first data is to be processed by the second component in at least one operation that is unrelated to the reception of data by the receiving unit; and
an evaluation unit to compare the first transmit sum and the first receive sum in a first comparison, evaluate the result of the first comparison, and provide a first transmission accuracy metric.

12. The system of claim 11, wherein the first data includes image data.

13. The system of claim 11, wherein the transmitting unit transmits data at one of a plurality of power levels and at one of a plurality of data rates, and if the first transmission accuracy metric is less than a particular threshold, adjusts one of:
(a) the power at which data is transmitted;
(b) the rate at which data is transmitted; and
(c) both the rate and the power at which data is transmitted.

14. The system of claim 11, wherein the transmitting unit re-transmits data if the transmission accuracy metric is less than a particular threshold.

15. The system of claim 11, wherein the first data includes audio data.

16. The system of claim 11, wherein:
the communications channel further includes a second communications path;
the first memory further stores a second transmit sum, the second transmit sum being a sum of second data transmitted on the second communications path by the transmitting unit, the second data defining address information, and the first accumulator further accumulates the second transmit sum;
the second memory further stores a second receive sum, the second receive sum being a sum of data received from the second communications path by the receiving unit, and the second accumulator further accumulates the second receive sum; and
the evaluation unit further compares the second transmit sum and the second receive sum in a second comparison, evaluates the result of the second comparison, and provides a second transmission accuracy metric.

17. The system of claim 16, wherein the transmitting unit re-transmits the first data if the first transmission accuracy metric is less than a first threshold, and re-transmits the second data if the second transmission accuracy metric is less than a second threshold, the first and second thresholds being different.

18. The system of claim 11, wherein first component is a host and the second component is a graphics display controller.

19. The system of claim 11, wherein the first data includes at least one instruction that is executed in the at least one operation that is unrelated to the reception of data.

20. The system of claim 16, wherein:
the transmitting unit transmits data at one of a plurality of power levels and at one of a plurality of data rates, and if the first transmission accuracy metric is less than a first threshold, adjusts one of:
(a) the power at which the first data is transmitted on at least the first communication path,
(b) the rate at which the first data is transmitted on at least the first communication path, or
(c) both the rate and the power at which the first data is transmitted on at least the first communication path; and
if the second transmission accuracy metric is less than a second threshold, re-transmits the second data, the first and second thresholds being different.

21. A computer readable medium embodying a program of instructions for execution by a machine to perform a method for detecting errors in transmitted data, comprising the steps of:
accumulating a transmit sum in a first memory, the transmit sum being a sum of first data transmitted on a first communication path, the first data to be used in at least one process that is unrelated to the communication of data on the first communication path;
accumulating a receive sum in a second memory, the receive sum being a sum of the data received from the first communication path; and
comparing the transmit and receive sums, and evaluating the result of the comparison by an evaluation unit, the comparing and evaluating to determine a transmission accuracy metric.

22. The medium of claim 21, wherein the comparing and evaluating to determine a transmission accuracy metric includes comparing the difference between the transmit and receive sums with one of first and second thresholds, the difference being compared with the first threshold if the first data includes at least one instruction that is executed in the at least one operation that is unrelated to the communication of data on the first communication path, and the difference being compared with the second threshold if the first data excludes at least one instruction that is executed in the at least one operation that is unrelated to the communication of data on the first communication path, the first and second thresholds being dissimilar.

23. The medium of claim 22, further comprising providing an indication to change the rate at which the first data is to be transmitted if the transmission accuracy metric is less than the particular threshold.

24. The medium of claim 22, further comprising providing an indication to adjust the power at which the first data is to be transmitted if the transmission accuracy metric is less than the particular threshold.

25. The medium of claim 21, further comprising causing the first data to be re-transmitted if the transmission accuracy metric is less than a particular threshold.

* * * * *